April 17, 1934.                M. T. WELLS                1,955,158
                               FILTER PAD
                          Filed Jan. 12, 1933           3 Sheets-Sheet 1
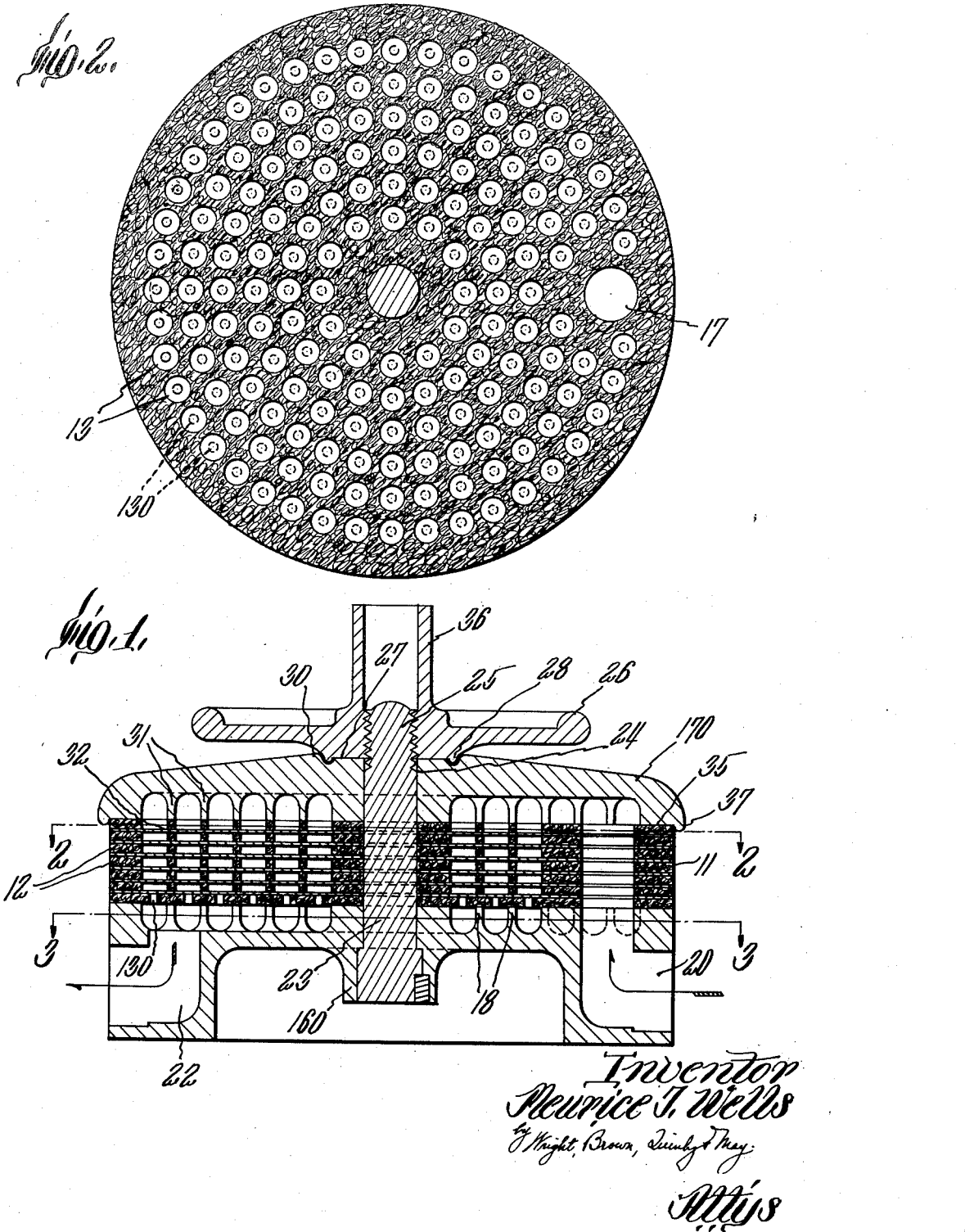

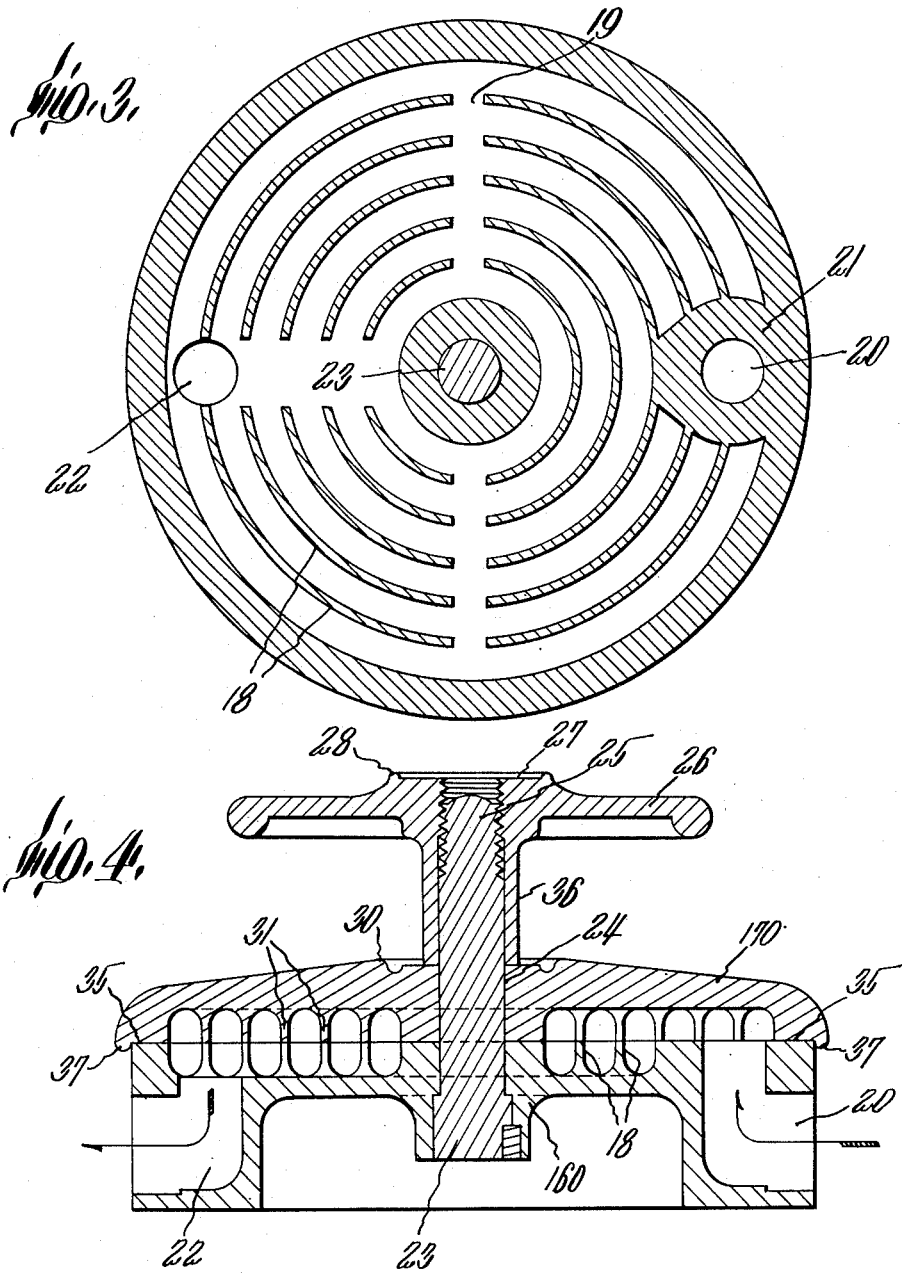

April 17, 1934.     M. T. WELLS     1,955,158
FILTER PAD
Filed Jan. 12, 1933     3 Sheets-Sheet 3
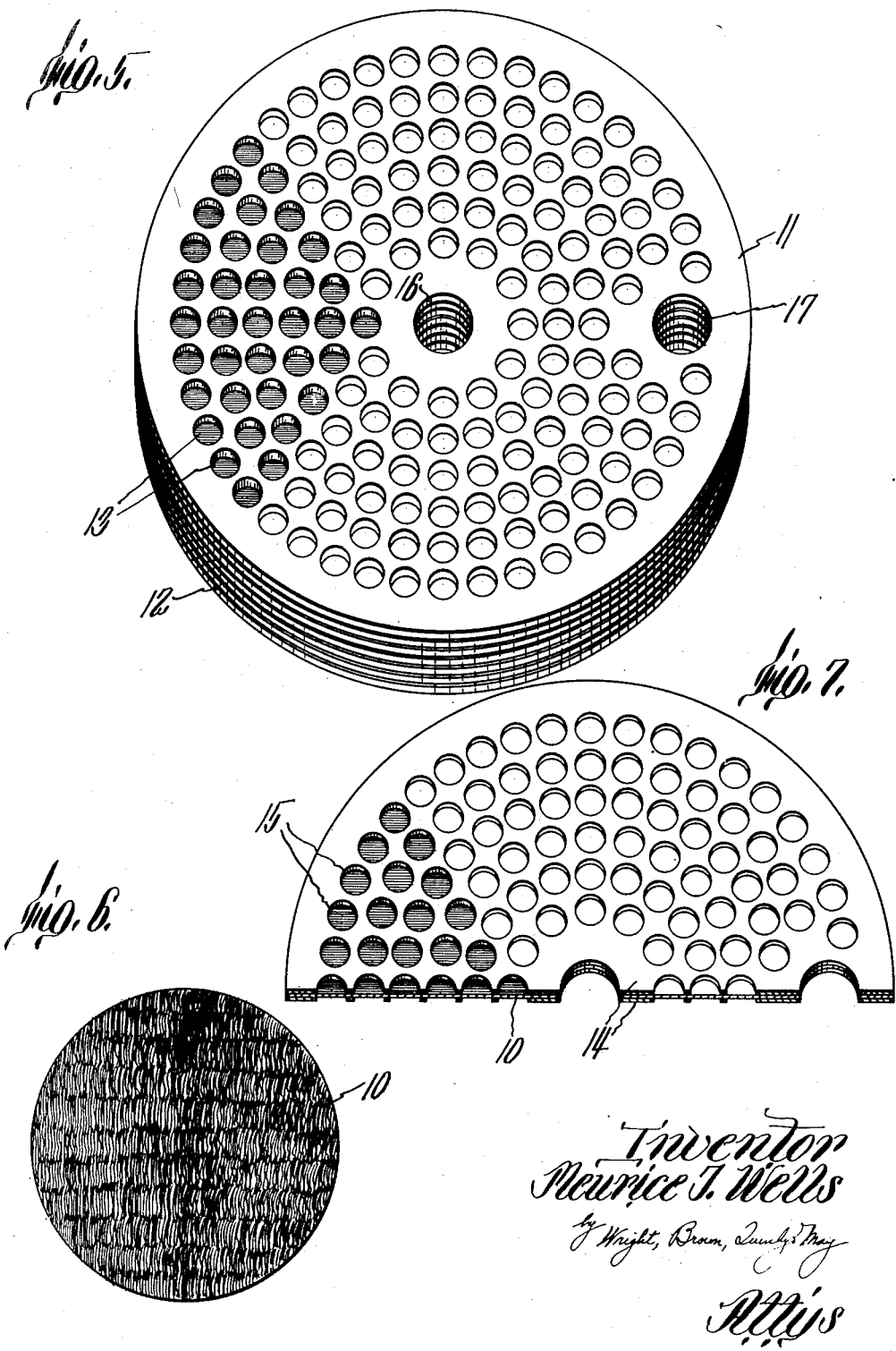

Patented Apr. 17, 1934

1,955,158

UNITED STATES PATENT OFFICE 1,955,158

FILTER PAD

Meurice T. Wells, Amesbury, Mass., assignor of one-third to J. Harold Goldman and one-third to Joseph Goldman, both of Boston, Mass.

Application January 12, 1933, Serial No. 651,304

7 Claims. (Cl. 210—185)

This invention relates to a filter, more particularly of the type whose filtering element consists of a pad or block through which the fluid to be filtered runs and which, after it has become fouled with impurities, can be removed and replaced. The invention devolves not only about the filter construction as a whole, but also about the pad or filtering element itself.

In accordance with the present invention, the fluid to be filtered undergoes multi-stage filtration through a succession of layers of fiber which are maintained in spaced relationship by substantially impermeable spacers or separators having aligned openings therein through which the fluid can freely pass, the alternating layers of fiber and spacers being built up successively into a filter pad or block. More specifically, the layers of fiber, each of which constitutes a filtering septum, consist of carded webs of fiber whose staple is preferably at least 3/4 inches. While fibers of shorter length might be employed in accordance with the principles of my invention, nevertheless, in its preferred and most practical embodiments, my invention involves the use of fibers possessing the minimum staple length cited. The opening in the spacers, through which the fluid passes, is of a maximum span or width less than the length of the staple in the carded webs, whose fibers can thus be pinched between the spacers adjacent to the spacer openings. The pinching of the fibers may be accomplished by confining the pad or block in a suitable frame or casing, for instance, between plates or headers equipped with appropriate clamping mechanism by which pressure can be exerted on the pad. Each of the headers is formed so as to define a chamber with the pad, one of the chambers serving to receive the fluid to be filtered and to distribute over one face of the pad, and the other chamber serving to receive the filtered fluid issuing from the other face of the pad. It is thus seen that the filter of the present invention is characterized by a simplicity and compactness of design. It is, moreover, capable of filtering large quantities of liquids of various descriptions with high effectiveness.

With the foregoing and other features and objects in view, I shall now proceed to describe my invention in greater detail in conjunction with the accompanying drawings, wherein,—

Figure 1 represents a vertical central section through a filter embodying the present invention.

Figure 2 is a transverse section along the line 2—2 of Figure 1.

Figure 3 is a similar section along the line 3—3 of Figure 1.

Figure 4 is a view similar to Figure 1, but with the filter pad removed and the filter casing closed to permit the flow of liquid therethrough.

Figure 5 shows in perspective a filter pad or block made up in accordance with the present invention and adapted for use in the casing shown in Figures 1 and 4.

Figure 6 is a plan view of a carded web constituting the filtering septum of the pad.

Figure 7 shows in perspective half of such a septum reinforced on both faces with sheet material having openings therein corresponding with those formed in the pad spacers.

Referring first to Figure 6 of the drawings, the web 10 shown therein constitutes one of a number of filtering septa employed in the filter pad or block of the present invention. While various long-fibered materials including jute, wool, silk, or the like, may be used in making the web, it is preferable to employ therein long-stapled cotton, e. g., Egyptian or Sea Island cotton. The web is made up of a number of layers of cotton in a carded, and preferably also combed, condition. The purpose of carding is to straighten out the tangled mass of raw cotton and to form a thin, substantially even layer, whose fibers lie preponderantly in parallelism in one direction, as shown in Figure 6. The purpose of combing is to enhance the parallelism of fiber lay, as well as to complete the removal of the short fibers, i. e., the lint and fuzz remaining after the carding operation. In some instances, the carded webs constituting the filtering septa may advantageously be prepared by superposing thin plies of carded cotton or the like with the fibers of one ply lying perpendicular to or otherwise angularly disposed to the fibers of an adjacent ply. In other words, a composite web of greater strength and of greater effectiveness as a filtering medium results when the fibers of one ply of the web lie in one direction and the fibers of an adjacent ply extend in crosswise or other angular disposition to the fibers of the first-named ply. It is preferable that the web made in any of the ways hereinbefore noted be of a thickness falling within the range of .003 to .010 inches, for if the web is of greater thickness, the fibers tend to mat to such an extent as to impede the flow of liquid to be filtered therethrough. A web lying at the lower end of the range is preferable for comparatively viscous or thick liquids, such as milk, heavy oils, syrups, fruit juices, soups, beer, or the like. Comparatively thin liquids, like water, gasolene, alcohol, light fuel and lubricating oils, may be successfully filtered through the thicker webs. In all cases, however, it is desirable that the cotton staple be of a length of at least ¾ inches. It is, indeed, preferable to employ cotton staple of maximum length, say, 1 to 1⅛ inches, because such staple gives the best results in actual practice. For instance, when milk is being filtered free from so-called "visible dirt", it is preferable to fabricate the carded web from cotton, whose staple is of one-inch or greater length. In such case, too, it is preferable to provide a filter pad having at least six independent filtering stages or carded webs, each of which has a thickness of about .006 inches. These factors are cited by way of illustration only, as the construction of the filter pad, including the number of filtering stages therein, the thickness of its carded webs, the length of staple, and other features, may be varied, depending upon such conditions as the viscosity of the liquid to be filtered, the content of filterable impurities carried thereby, etc. Even milks vary in their viscosity, which, as is well known, is a function of the fat content of the milk.

As already indicated, the carded webs constituting the filtering septa are assembled in alternating succession with substantially impermeable spacers or separator plates into a filter pad or block 11 as shown in Figure 5. Because this filter pad is designed to be used in a cylindrical frame or casing, it is shown as being cylindrical, although it might possess any other suitable form or shape. Each spacer 12 consists of a disk having a multiplicity of openings 13 therethrough, which are preferably distributed uniformly in concentric series and are in alignment with the corresponding openings in the other spacers. While the openings illustrated are shown as being circular, they may be of any other suitable shape. For instance, it might be advantageous in some case to form hexagonal or diamond-shaped openings through the spacers, as these would afford a greater operative filtering area with a given spacer area. In any event, however, each spacer disk is of suitable thickness, namely, preferably not less than ⅛ inch, so as to prevent the spaced carded webs from coming into contact with one another on account of sagging which may ensue from the liquid pressure exerted thereupon during a filtering operation. One of the important features of the pad of the present invention is that the openings 13 are of a diameter less than the length of the cotton staple of the carded webs. This means that when the pad is put into a frame or casing and pressure is applied to the pad material between the openings, the staple will be pinched or held securely adjacent to the openings and accordingly that collapse of the carded webs during the passage of the liquid to be filtered therethrough will be inhibited. There is sufficient flat wall between the openings in the spacers to hold the cotton staple of the carded webs securely against displacement. In this connection, it might be remarked that wire cloth or screening was experimented with as a spacer material, but serious trouble arose because the wire cloth did not present sufficient depth or thickness to inhibit matting of the successive filtering stages and it did not exercise a sufficient grip on the cotton staples in the carded webs to prevent collapse of the filtering stages. The choice of material to be used in making the spacer is a wide one, depending upon the service to which the filter pad is to be put. For instance, the use of permanent spacers made from metal, such as brass and aluminum, or from plastics, such as bakelite, casein, gypsum, porcelain, or the like, may be advantageous in connection with the filtration of liquids of the nature of gasolene, oil, aclohol, and the like. When edible liquids intended for human consumption, such as milk, soup, beer, and the like, is being filtered, it is distinctly preferable to employ paper or wood pulp spacers, as these are inexpensive and can be discarded after a single use, thereby ensuring sanitary filtration. A paper or wood pulp spacer may be molded as a unitary structure or it may consist of a number of plies of paper or paperboard stuck or pasted together. The filter pad or block may consist of the desired number of carded cotton webs and paper or wood pulp spacers in superposed united relationship, the carded webs being combined with the spacers through the use of adhesive, staples, or other suitable fastening means. The assembly of the carded cotton webs and such spacers may, however, be a loose one as in the case of permanent spacers.

It is preferable that comparatively pure pulp free from sizing and other foreign ingredients which might have a deleterious effect on liquid edibles be employed in making the pulp spacers. Indeed, it is preferable to use a refined wood or rag pulp composed substantially of alpha cellulose as the material for making the spacers, as such pulp is free from contaminations which might be picked up by liquid edibles. If a sizing ingredient is used with the paper or pulpboard constituting the spacers, it is desirable that the sizing ingredient be an inert one. So, too, any adhesive or bonding material employed for sticking the carded cotton webs in face-to-face relationship with the spacers should also be of an inert character. When the component layers of the pad are arranged in loose superposed relationship, the compression which the pad undergoes in the filter frame or casing is sufficient to keep the successive layers against relative displacement as well as to prevent leakage at their edge portions. When a permanent spacer is employed, the operator may, after the filter becomes clogged, disassemble the filter pad by removing and discarding the fouled filtering septa and replacing them by new ones. In the event that the operator finds the lower webs of the pad to be comparatively clean, they may be re-used as the top stages of the newly prepared pad, whereas fresh carded webs may be inserted as the lower filtering or finishing filtering stages.

Inasmuch as carded cotton webs such as are employed for the purpose of the present invention, may be flimsy and tenuous and so be difficult to handle without tearing or rupture, it is preferable to reinforce them on either or both faces with a backing of paper, e. g., kraft paper, adhesively secured thereto. A web so reinforced is shown in Figure 7, wherein the web 10 has adhesively secured thereto on both its faces paper backings 14 having openings 15 therein similar to those in the spacers. In assembling such reinforced webs with the spacers, the openings 15 in the paper backings should, of course, be aligned with the openings 13 in the spacers. The expedient of reinforcing the carded web is intended more particularly in connection with webs which are to serve in a filter pad equipped with permanent separators, as the building up or renewal of the filtering element requires the handling of the carded web.

In the case of permanent separator plates, there may, under certain circumstances, be a tendency for the holes in the plates to become more or less obstructed as a result of continued service over a period of time. In such case, the spacer material surrounding the spacer openings may be cleaned by passing suitable brushes through the openings, e. g., gang brushes of a type designed to handle one or a pile of spacers at a single stroke. The spacer should, as already indicated, preferably be of at least about 1/8 inch thickness. It may be of any greater thickness, but practical considerations dictate that the thickness should not exceed about 3/8 inches.

The pad shown in Figure 5 is intended to be used in a particular form of frame or casing requiring it to have a central bore 16 and a bore 17 in line therewith near the margin of the pad. A spacer is furnished at the top and the bottom of the pad so that the desired pinching of the uppermost and lowermost filtering septa may be had through the exertion of pressure on the pad. Sufficient marginal spacer area, as well as that surrounding the bores 16 and 17, is left imperforate so as to minimize the danger of leakage at these regions.

The filter frame or casing, in which the pad of the present invention is used, comprises, as best shown in Figure 1, a base plate or header 160 and a top plate or header 170. As shown in Figure 3, the base plate is recessed or grooved concentrically at those areas corresponding with the concentric rows of openings 13 through the spacers, the recesses or grooves being defined by ribs 18 and the recesses intercommunicating by virtue of radial channels 19 cut through the ribs. The base additionally includes a liquid inlet 20 formed through one side and extending upwardly through a smooth-faced block 21 which lies on the same plane as the crests of the ribs 18, which are also smoothly finished. A liquid outlet 22 is formed through a side of the base plate opposite to the inlet 20, wherefore, the base can be connected to a straight line of pipe.

Projecting upwardly and centrally from the base plate 160 is a post 23 which passes through the central bore of the pad 11 and enters into and through a central opening 24 formed in the top plate 170. The end portion 25 of the post, which extends beyond the upper face of the plate 170, is threaded so as to be engaged by internally threaded hand-wheel 26 having a smooth lower hub face 27 bearing on similar surface adjacent to the opening 24. Preferably, a marginal rib 28 extends outwardly from the hub face 27 and enters into a complemental groove formed in the plate 170 and flanked by a wall 30 which terminates on a plane above the surface 27. The rib 28 and the wall 30 serve to protect the surfaces 27 from injury when the hand-wheel or the upper plate are dropped on a cement or other hard floor. The upper plate is made essentially like the lower one, being provided with concentric intercommunicating grooves defined by ribs 31 which are arranged to bear against the pad substance 32 between the concentric rows of openings 13 in the spacers. The pad 11 is placed on the base plate 160 so that the bore 17 becomes a continuation of the inlet opening 20.

With the pad in place between the upper and lower plates 160 and 170, respectively, the hand-wheel 26 is turned so as to clamp the pad in position under appropriate pressure. A main reason for employing a hand-wheel for applying the clamping pressure to the top plate is that the pressure can be limited to one which can be safely applied without cracking or otherwise injuring the pad. The hand-wheel should be of a size designed to ensure a clamping pressure which will not result in leakage at the side walls of the pad when liquids are being run therethrough.

The action of the filter may be described as follows. The liquid to be filtered is introduced through the inlet opening 20 and passes upwardly through the bore 17 into the upper chamber defined by the plate 170 and the filter pad. The liquid undergoes a substantially uniform distribution to the various openings in the top separator plate and, after passing through these openings, meets the first carded web which serves to catch or retain most of the filterable impurities. The rest of the filterable impurities are retained in decreasing proportion upon the successive carded webs through which the liquid must pass before it reaches the accumulating or receiving chamber defined by the plate 160 and the filter pad. The last carded web through which the liquid passes catches the least amount of impurities, and, the pad is preferably so built up that this web will show no visible particles even after the first filtering septa have become so fouled as to necessitate renewal. In some cases, it may be that the first filtering septum will become entirely clogged, in consequence of which the pressure of the liquid on this septum may become so great as to force its carded fibers apart or to break them. In such instances, the second carded web becomes, in effect, the first filtering stage. The first filtering stage can accumulate impurities up to a certain point, whereupon flow of the liquid will be noticeably cut down, particularly when the filter is operated in combination with other apparatus, such as a bottling machine, which requires a definite flow of liquid. A new pad or new filtering septa must then be installed in the filter, as hereinbefore described. It is thus seen that the filter of the present invention will not permit liquid containing undesirable matter to get by it. On the contrary, when the filter pad becomes badly contaminated, flow of liquid is decreased to such an extent that the filter must be attended to, that is, the filter pad or its filtering septa must be renovated.

It is preferable that the last separator plate be provided, as shown in Figure 1, with the same number of openings 130 as the other separator plates, but that these openings be of a much smaller area. This is for the purpose of restricting the rate of flow of liquid through the pad and thus to prevent the liquid from coming through the pad at such high velocities as to break the staple of the carded webs. In other words, a restricted discharge or efflux of liquid from the filter pad is desirable in order to avoid such high velocity through the carded webs as might cause a rupture of the cotton staples pinched between the separator plates. The restricted efflux further ensures a substantially uniform distribution of the liquid to all of the separator openings, rather than a selective or localized flow through some of the openings such as might otherwise tend to take place.

In order to attain a particular capacity of filtration, it is of course possible to connect a number of the filters of the present invention in series or in parallel or in a combined series-parallel arrangement.

Rather than running the liquid to be filtered into the filter through the inlet opening 20 communicating with the receiving chamber above the filter pad, whence the liquid flows through the pad and is discharged through the outlet opening 22, the direction of flow may be reversed, that is, the liquid to be filtered may be introduced into the filter by way of the opening 22, whence it passes upwardly through the pad into the chamber above the pad, from which it passes downwardly and outwardly through the opening 20. This reversal of liquid flow may, in fact, be preferred by reason of the fact that there is less tendency for the first filtering stage, namely, the lowermost carded web, to become fouled with impurities, particularly those of a coarse nature having high specific gravity. It will be appreciated that there is a tendency for the impurities, especially those of a coarse variety and of high specific gravity, to become dislodged from the lowermost filtering septum with which they first contact and to settle on the bottom header or plate 160 of the filter casing, from which they may readily be removed during cleansing of the casing. It is to be remarked that under the forced circulation of the liquid to be filtered, accompanied by considerable swirling or eddying of such liquid, there is a marked tendency for the impurities to remain suspended in the liquid and to settle out on the bottom header or plate 160, rather than to attach themselves to the lowermost filtering septum, thereby promoting a maintenance of the pad as a whole in an unfouled condition conducive to the ready influx of liquid thereinto and therethrough. When the liquid flow is upward, rather than downward, through the filter pad, it is of course desirable to invert the pad from the position shown in Figure 1 so that the small diameter openings 130 exist in the uppermost spacer.

In filtering liquids containing coarse particles presenting sharp edges, such as water or milk containing ice fragments, it is preferable that the face of the pad, with which the liquid first contacts, be protected by comparatively coarse mesh cloth, e. g., cheese cloth or wire cloth, which, although it permits substantially unimpeded flow of the liquid and comparatively fine impurities therethrough, nevertheless prevents access of the coarse, sharp-edged particles which might tend to cut through the fibers of the carded webs constituting the filtering septa and thus give rise to rupture of the septa.

It may be desirable to run liquid, e. g., a cleaning liquid, through a system, including the filter casing of the present invention, without disconnecting or by-passing the casing. In such case, the liquid may be run through the filter casing from which the filtering pad has been removed, as illustrated in Figure 4. As shown in this figure, the marginal areas 35 of the base plate 160 and the top plate 170 are nicely finished so that they may be brought to bear against each other and sufficient clamping pressure exerted by the hand-wheel 26 to effect a seal at these areas. If desired, a gasket of leather, rubber, or other suitable material, may be used at the contacting areas to ensure a perfect seal. Preferably a marginal flange 37 projects downwardly from the area 35 of the removable top plate 170 and engages over the edge portion of the base plate 160. This flange prevents marring of the top plate at the area 35 when it is dropped on a hard floor. The hand-wheel 26 may have an elongated hub portion 36, whose internal wall is smooth, which permits the hand-wheel to be inverted from its position shown in Figure 1 to that shown in Figure 4, so as to minimize the number of turns which need be made on the hand-wheel when the casing is closed in the absence of a filter pad.

It is, of course, possible to vary certain features in the filter frame or casing. For instance, instead of machining or casting the grooves of the bottom and top headers, it is possible to weld or otherwise secure rings or arcuate strips to flat-face castings to provide intercommunicating channels for defining the distributing and receiving chambers of the filter. So too, it is unnecessary that the grooves be concentric ones. On the contrary, one might provide rectilinear rather than curvilinear grooves intercommunicating with one another. Such a design would be an appropriate one when the openings in the separator plates are of rectangular or other polygonal configuration. In other words, the shape of the ribs which define the grooves in the headers should comport with the particular configuration and arrangement of the openings in the separator plates. It might further be mentioned that the headers, rather than being clamped at their central portions, might be clamped at their edge or peripheral portions especially in those instances when the filter is of comparatively large diameter and it becomes difficult to distribute the clamping pressure substantially uniformly over the entire filter pad, thereby necessitating the application of pressure at equidistant intervals at the marginal portions of the pad. If desired, the upper header may be equipped with the inlet opening, rather than providing the lower header with such an opening.

It is to be observed that in the filter of the present invention, the marginal portions of the filter pad itself serve as the sealing means for the filter, thereby doing away with the need for gaskets, packing, or the like. Should there be leakage in the pad material between the spacer openings, no harm results because the leaking liquid must necessarily pass through the filtering septa and thereby have its impurities removed. Normally, however, the gripped portions of the filtering webs are held uniformly under sufficient pressure to prevent such leakage. Inasmuch as the edge portions of the pad are exposed to view, any outward or edge leakage in the pad is discernible so that the operator may correct any escape of liquid at the edge portions of the pad. It is to be further observed that the post for centering the pad is unexposed at any point to the action of the liquid being filtered. This eliminates such trouble as might otherwise be encountered in maintaining edible liquids being filtered in a sanitary condition. It is also to be noted that space for receiving the filtrate is of considerable larger cross-sectional area than the combined cross-sectional area of the discharge orifices in the last separator plate. This means that the receiving chamber is more than large enough to handle all the filtrate passing through the filter pad. Indeed, the design of the filter is such as to avoid overload at any point therein.

While the filter of the present invention may be used in connection with various liquids, it has particular merit for filtering milk, as it permits perfect filtration of cold milk, i. e., milk at a temperature as low as 34° F. When using cloth filters, such as have heretofore served for this purpose, it is necessary to heat milk to temperatures of at least 120° F. to realize filtering action without immediate plugging of the filter cloth. This has been done by filtering at some stage of preheating, say, before or after pasteurization, but before cooling. In filtering milk at elevated temperatures, there is tendency for bacteria to flourish in the milk and for barn and other dirt to become cooked and impart an objectionable odor and taste to the milk. The filter of the present invention not only permits cold milk to be filtered successfully therethrough, but it is more effective in retaining fine particles, for example, the objectionable material known as garget sometimes appearing in milk. There are many other objections to the usual filter cloths which the filter of the present invention overcomes. As already indicated, the filter of the present invention eliminates fine particles such as cannot be removed by the single-stage filtering action of a cloth filter. Again, the filter of the present invention allows a much greater flow of liquid therethrough per unit of exposed area than a cloth filter. An important advantage possessed by the filtering septa of the present invention is that they are comparatively inexpensive and can hence be discarded after only a single use. A filter cloth, on the other hand, is comparatively expensive so that it is the practice to wash and sterilize the cloth repeatedly. The napped surface of the cloth serving as the filtering medium is thereby impaired in its efficiency, for the fibers forming the nap are free to move relatively and become displaced, thereby permitting comparatively coarse particles to pass through the interstices of the cloth. Another serious fault with the filter cloth is that should it be torn or rent during service, the liquid, together with all its contained impurities, passes through the tear opening without being filtered. This condition can escape without being detected, since there is no way of telling that a filter cloth has been torn until its casing is opened and inspected. This condition cannot exist in the filter of the present invention which, as already stressed, is equipped with many filtering stages, wherefore, should any stage become ineffective on account of break-through of a carded web constituting such stage, the other stages will effect the desired filtering action. Finally, the filter pad of the present invention may be handled without contamination of the filtering septa, as it can be made up as an integral unit from carded web and pulpboard separators which are inexpensive enough to be discarded after a single use. The pulpboard separators constituting the top and bottom members of the pad, even if handled by the operator, do not contact at those regions which have been handled with the liquid passing through the pad. A filter cloth, on the other hand, undergoes considerable handling by the operator during installation and may hence become contaminated by the operator's hands.

I claim:

1. A pad for filtering fluids made up of a succession of alternating carded webs of fiber and substantially impermeable spacers having a plurality of openings therethrough, each of said fiber webs forming an individual filter layer, the fluid being filtered being capable of passing through said layers and through the openings in said spacers disposed between each two adjacent layers in series, the openings through said spacers being of a maximum span where crossed by said fibers less than the length of said fibers, whereby the spacers pinch the fibers and hold them in position.

2. A pad for filtering fluids made up of a succession of alternating carded webs of fiber and substantially impermeable spacers substantially coextensive with said webs, said spacers having a plurality of openings therethrough, each of said fiber webs forming an individual filter layer, the fluid being filtered being capable of passing through said layers and through the openings in said spacers disposed between each two adjacent layers in series, the openings through said spacers being of a maximum span where crossed by said fibers less than the length of said fibers, whereby the spacers pinch the fibers and hold them in position.

3. A pad for filtering fluids made up of a succession of alternating carded webs of fiber, reinforcing means substantially coextensive with the faces of said web, and substantially impermeable spacers having a plurality of openings therethrough, each of said fiber webs forming an individual filter layer, the fluid being filtered being capable of passing through said layers and through the openings in said spacers disposed between each two adjacent layers in series, the openings through said spacers being of a maximum span where crossed by said fibers less than the length of said fibers, whereby the spacers pinch the fibers and hold them in position.

4. A pad for filtering fluids made up of a succession of alternating carded webs of fiber, each of said webs being reinforced at least on one face by a paper backing adhesively secured thereto, and substantially impermeable spacers having a plurality of openings therethrough, each of said fiber webs forming an individual filter layer, the fluid being filtered being capable of passing through said layers and through the openings in said spacers disposed between each two adjacent layers in series, the openings through said spacers being of a maximum span where crossed by said fibers less than the length of said fibers, whereby the spacers pinch the fibers and hold them in position, said paper backing having openings therethrough corresponding to and in alignment with the openings in said spacers.

5. A pad for filtering fluids made up of a succession of alternating carded webs of fiber and substantially impermeable spacers having a plurality of openings therethrough, each of said fiber webs forming an individual filter layer, the fluid being filtered being capable of passing through said layers and through the openings in said spacers disposed between each two adjacent layers in series, the length of fibers in said carded webs being not less than about one inch and the openings through said spacers being of a maximum span where crossed by said fibers less than the length of said fibers, whereby the spacers pinch the fibers and hold them in position.

6. A pad for filtering fluids made up of a succession of alternating carded webs of cotton fibers, whose length of staple is greater than three-fourths inches, and substantially impermeable pulp board spacers having a plurality of openings therethrough, each of said fiber webs forming an individual filter layer, the fluid being filtered being capable of passing through said layers and through the openings in said spacers between each two adjacent layers in series, said openings in said spacers being of a maximum span where crossed by the fibers less than the length of staple in said carded webs, whereby the spacers pinch the fibres and hold them in position.

7. A pad for filtering fluids made up of a succession of alternating carded webs of cotton fiber, whose lenth of staple is greater than three-fourths inches and whose thickness is about .003 to .010 inches and substantially impermeable spacers having a plurality of openings therethrough, said spacers being of a thickness of about one-eighth to three-eighths inches, each of said fiber webs forming an individual filter layer, the fluid being filtered being capable of passing through said layers and through the openings in said spacers disposed between each two adjacent layers in series, the openings in said spacers being of a maximum span where crossed by the fibers less than the length of staple in said carded webs, whereby the spacers pinch the fibers and hold them in position.

MEURICE T. WELLS.